(12) United States Patent
Suzuki et al.

(10) Patent No.: US 10,525,792 B2
(45) Date of Patent: Jan. 7, 2020

(54) VEHICULAR AIR-CONDITIONING DEVICE

(71) Applicant: SANDEN AUTOMOTIVE CLIMATE SYSTEMS CORPORATION, Isesaki-shi (JP)

(72) Inventors: Kenichi Suzuki, Isesaki (JP); Ryo Miyakoshi, Isesaki (JP); Kohei Yamashita, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 66 days.

(21) Appl. No.: 15/579,712

(22) PCT Filed: Jun. 1, 2016

(86) PCT No.: PCT/JP2016/066097
§ 371 (c)(1),
(2) Date: Dec. 5, 2017

(87) PCT Pub. No.: WO2016/203943
PCT Pub. Date: Dec. 22, 2016

(65) Prior Publication Data
US 2018/0178628 A1  Jun. 28, 2018

(30) Foreign Application Priority Data

Jun. 19, 2015  (JP) ................... 2015-123657

(51) Int. Cl.
*B60H 1/00* (2006.01)
*B60H 1/32* (2006.01)

(52) U.S. Cl.
CPC ..... *B60H 1/00921* (2013.01); *B60H 1/00385* (2013.01); *B60H 2001/006* (2013.01);
(Continued)

(58) Field of Classification Search
CPC ............ B60H 1/00385; B60H 1/00921; B60H 1/3208; B60H 1/3229; B60H 2001/006;
(Continued)

(56) References Cited

U.S. PATENT DOCUMENTS 6,077,158 A * 6/2000 Lake .................. B60H 1/00278
454/70
6,089,034 A * 7/2000 Lake .................. B60H 1/00907
62/204
(Continued)

FOREIGN PATENT DOCUMENTS

CN  104271373  1/2015
JP  S 60-162841 U  10/1985
(Continued)

OTHER PUBLICATIONS

Office Action dated Sep. 3, 2019 issued in Chinese Patent Application No. 201680034886.9.

*Primary Examiner* — Henry T Crenshaw
(74) *Attorney, Agent, or Firm* — Cozen O'Connor

(57) ABSTRACT

Vehicular air-conditioning device capable of inhibiting liquid return and generation of noise in an accumulator on startup of a compressor, and improving reliability and comfort. A controller lets a refrigerant discharged from a compressor 2 radiate heat in a radiator 4, and decompresses the refrigerant from which the heat has been radiated, to let the refrigerant absorb heat in an outdoor heat exchanger 7, thereby heating a vehicle interior. On startup of the compressor 2, the controller continues an operation at a predetermined startup number of revolution for a predetermined time, and then raises a number of revolution of the compressor 2 to a predetermined target number of revolution at a predetermined rising speed, and changes the startup number of revolution of the compressor 2 so as to lower the
(Continued)

startup number of revolution as the outdoor air temperature is higher, on the basis of an outdoor air temperature.

10 Claims, 9 Drawing Sheets

(52) U.S. Cl.
CPC .............. *B60H 2001/00928* (2013.01); *B60H 2001/00949* (2013.01); *B60H 2001/3285* (2013.01)

(58) Field of Classification Search
CPC ........... B60H 2001/00928; B60H 2001/00949; B60H 2001/3255; B60H 2001/3272; B60H 2001/3285
See application file for complete search history.

(56) References Cited

U.S. PATENT DOCUMENTS

| | | | | |
|---|---|---|---|---|
| 6,314,750 | B1* | 11/2001 | Ishikawa | B60H 1/00921 62/324.1 |
| 6,487,869 | B1* | 12/2002 | Sulc | B60H 1/3205 62/228.4 |
| 7,121,103 | B2* | 10/2006 | Itoh | B60H 1/00735 62/173 |
| 2014/0138451 | A1* | 5/2014 | Pham | F04B 35/04 237/12 |
| 2014/0238067 | A1* | 8/2014 | Itou | F25B 41/04 62/324.6 |
| 2015/0075205 | A1* | 3/2015 | Ramayya | F04B 39/02 62/324.6 |
| 2015/0096313 | A1* | 4/2015 | Ragazzi | B60H 1/00485 62/115 |
| 2015/0323225 | A1* | 11/2015 | Matsumoto | F25B 5/04 62/324.1 |
| 2018/0178628 | A1* | 6/2018 | Suzuki | B60H 1/00385 |

FOREIGN PATENT DOCUMENTS

| | | |
|---|---|---|
| JP | 62-72571 | 5/1987 |
| JP | 9-119693 | 5/1997 |
| JP | 11-5437 | 1/1999 |
| JP | 2009-299986 | 12/2009 |
| JP | 2012-228945 | 11/2012 |
| JP | 2015-42508 | 3/2015 |
| WO | WO 2009/150824 | 12/2009 |

* cited by examiner

VEHICULAR AIR-CONDITIONING DEVICE

RELATED APPLICATIONS

This is a U.S. National Phase Application under 35 USC 371 of International Application PCT/JP2016/066097 filed on Jun. 1, 2016.

This application claims the priority of Japanese application no. 2015-123657 filed Jun. 16, 2015, the entire content of which is hereby incorporated by reference.

TECHNICAL FIELD

The present invention relates to a vehicular air-conditioning device of a heat pump system which conditions air of a vehicle interior, and more particularly, it relates to a vehicular air-conditioning device which is suitable for a hybrid car or an electric car.

BACKGROUND ART

Due to actualization of environmental problems in recent years, hybrid cars and electric cars have spread. Further, as an air-conditioning device which is applicable to such a vehicle, there has been developed an air-conditioning device which includes a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let the refrigerant radiate or absorb heat, and which changes and executes a heating operation of letting the refrigerant discharged from the compressor radiate heat in the radiator and letting the refrigerant from which the heat has been radiated in this radiator absorb heat in the outdoor heat exchanger, a dehumidifying and heating operation or a dehumidifying and cooling operation of letting the refrigerant discharged from the compressor radiate heat in the radiator and letting the refrigerant from which the heat has been radiated in the radiator absorb heat in the heat absorber, and a cooling operation of letting the refrigerant discharged from the compressor radiate heat in the outdoor heat exchanger and letting the refrigerant absorb heat in the heat absorber.

In this case, an accumulator is provided on a refrigerant suction side of the compressor, the refrigerant is once stored in this accumulator to separate a gas and a liquid, and a gas refrigerant is sucked into the compressor to prevent or inhibit the liquid from being returned to the compressor (e.g., Patent Document 1).

CITATION LIST

Patent Documents

Patent Document 1: Japanese Patent Application Publication No. 2012-228945

SUMMARY OF THE INVENTION

Problems to be Solved by the Invention

Here, a refrigerant and oil flowing out from a compressor through a refrigerant circuit flow into an accumulator during stopping of the compressor, a liquid part of the inflow remains in the accumulator, and the oil having smaller specific weight forms a layer on the liquid refrigerant in a state of covering the refrigerant with an oil lid. Furthermore, in a heating operation to be executed in an environment where an outdoor air temperature is low, amounts of the liquid refrigerant and oil which remain in the accumulator increase, and hence an oil surface (a liquid surface in the accumulator) rises close to an outlet of the accumulator.

When the compressor starts in such a state and a pressure in the accumulator rapidly drops, there occurs a phenomenon, so-called bumping where the refrigerant under the oil boils without stopping, to evaporate, and intensively breaks through the upper oil layer. In particular, on the startup of the compressor under an environment where the outdoor air temperature is comparatively high, a density of the refrigerant also increases, and hence an amount of the refrigerant to be sucked into the compressor also increases. Therefore, when a number of revolution (i.e., the number of revolutions per minute (rpm)) of the compressor heightens at an early stage, the pressure in the accumulator rapidly drops, thereby easily causing the bumping.

Furthermore, when this bumping intensifies, a large amount of the liquid refrigerant in the accumulator is pushed out from the outlet, and hence excessive liquid return to the compressor occurs, thereby impairing reliability of the compressor due to liquid compression. Additionally, the bumping phenomenon in the accumulator involves a comparatively loud noise, and hence there has also been the problem that the generation of the noise impairs comfort of passengers.

The present invention has been developed to solve such conventional technical problems, and an object thereof is to provide a vehicular air-conditioning device which is capable of inhibiting liquid return and generation of noise in an accumulator on startup of a compressor and improving reliability and comfort.

Means for solving the Problems

A vehicular air-conditioning device of the present invention includes a compressor to compress a refrigerant, an air flow passage through which air to be supplied to a vehicle interior flows, a radiator disposed in this air flow passage to let the refrigerant radiate heat, an outdoor heat exchanger disposed outside the vehicle interior to let the refrigerant absorb heat, an accumulator connected to a refrigerant suction side of the compressor, and a control means, so that the control means lets the refrigerant discharged from the compressor radiate heat in the radiator and decompresses the refrigerant from which the heat has been radiated, to let the refrigerant absorb heat in the outdoor heat exchanger, thereby heating the vehicle interior, and the vehicular air-conditioning device is characterized in that on startup of the compressor, the control means continues an operation at a predetermined startup number of revolution for a predetermined time, and then raises a number of revolution of the compressor to a predetermined target number of revolution at a predetermined rising speed, and changes the startup number of revolution of the compressor so as to lower the startup number of revolution as the outdoor air temperature is higher, on the basis of an outdoor air temperature.

The vehicular air-conditioning device of the invention of claim 2 is characterized in that in the above invention, the control means changes the predetermined time so as to lengthen the predetermined time as the outdoor air temperature is higher, on the basis of the outdoor air temperature.

The vehicular air-conditioning device of the invention of claim 3 is characterized in that in the above respective inventions, on the basis of the outdoor air temperature, the control means changes the rising speed so as to decrease the rising speed as the outdoor air temperature is higher.

The vehicular air-conditioning device of the invention of claim 4 includes an outdoor expansion valve to decompress the refrigerant flowing into the outdoor heat exchanger in the above respective inventions, and is characterized in that the control means executes valve position limiting control to adjust a valve position of the outdoor expansion valve to a predetermined fixed position on the startup of the compressor, and cancels the valve position limiting control after the number of revolution of the compressor reaches the target number of revolution.

The vehicular air-conditioning device of the invention of claim 5 includes an outdoor expansion valve to decompress the refrigerant flowing into the outdoor heat exchanger in the inventions of claim 1 to claim 3, and is characterized in that the control means executes valve position limiting control to adjust a valve position of the outdoor expansion valve to a predetermined position on the startup of the compressor and then to gradually expand the valve position, and the control means cancels the valve position limiting control after the number of revolution of the compressor reaches the target number of revolution.

The vehicular air-conditioning device of the invention of claim 6 is characterized in that in the invention of claim 4 or claim 5, on the basis of the outdoor air temperature, the control means changes the fixed position or the predetermined position in the valve position limiting control so as to enlarge the position as the outdoor air temperature is higher.

The vehicular air-conditioning device of the invention of claim 7 includes an opening/closing valve connected to an upstream side of a refrigerant flow to the accumulator and opened during heating in the above respective inventions, and is characterized in that when the control means stops the compressor, the control means closes the opening/closing valve, operates the compressor for the predetermined time, and then stops the compressor.

The vehicular air-conditioning device of the invention of claim 8 is characterized in that in the above invention, the control means lowers the number of revolution of the compressor, and then closes the opening/closing valve.

The vehicular air-conditioning device of the invention of claim 9 includes an outdoor expansion valve to decompress the refrigerant flowing into the outdoor heat exchanger in the invention of claim 7 or claim 8, and is characterized in that the control means closes the opening/closing valve and operates the compressor for the predetermined time while reducing a valve position of the outdoor expansion valve.

Advantageous Effect of the Invention

According to the present invention, a vehicular air-conditioning device includes a compressor to compress a refrigerant, an air flow passage through which air to be supplied to a vehicle interior flows, a radiator disposed in this air flow passage to let the refrigerant radiate heat, an outdoor heat exchanger disposed outside the vehicle interior to let the refrigerant absorb heat, an accumulator connected to a refrigerant suction side of the compressor, and a control means, so that the control means lets the refrigerant discharged from the compressor radiate heat in the radiator, and decompresses the refrigerant from which the heat has been radiated, to let the refrigerant absorb heat in the outdoor heat exchanger, thereby heating the vehicle interior, and in the vehicular air-conditioning device, on startup of the compressor, the control means continues an operation at a predetermined startup number of revolution for a predetermined time, and then raises a number of revolution of the compressor to a predetermined target number of revolution at a predetermined rising speed, and changes the startup number of revolution of the compressor so as to lower the startup number of revolution as the outdoor air temperature is higher, on the basis of an outdoor air temperature. Therefore, in an environment where a refrigerant density increases, the control means lowers the startup number of revolution of the compressor, and hence it is possible to inhibit rapid pressure drop in the accumulator.

Consequently, it is possible to accurately prevent or inhibit bumping of the refrigerant in the accumulator on the startup of the compressor, it is possible to effectively cancel or inhibit generations of liquid compression in the compressor and noise in the accumulator, reliability of the vehicular air-conditioning device can improve, and comfort of passengers can also effectively improve.

In this case, as in the invention of claim 2, the control means changes the predetermined time so as to lengthen the predetermined time as the outdoor air temperature is higher, on the basis of the outdoor air temperature. Consequently, in the environment where the refrigerant density increases, the control means lengthens the predetermined time for which the compressor operates at the startup number of revolution, and hence it is possible to further inhibit the rapid pressure drop in the accumulator. In consequence, the controller accurately adjusts the operation time at the startup number of revolution of the compressor on the basis of the outdoor air temperature, and the bumping in the accumulator is further securely inhibited so that the improvements of the reliability and comfort are achievable.

Furthermore, as in the invention of claim 3, on the basis of the outdoor air temperature, the control means changes the rising speed so as to decrease the rising speed as the outdoor air temperature is higher. Consequently, in the environment where the refrigerant density increases, the control means decreases the speed at which the number of revolution of the compressor rises from the startup number of revolution, and hence it is possible to further inhibit the rapid pressure drop in the accumulator. In consequence, the controller accurately adjusts the rising speed of the number of revolution of the compressor on the basis of the outdoor air temperature, and the bumping in the accumulator is further securely inhibited so that the improvements of the reliability and comfort are achievable.

Additionally, as in the invention of claim 4, the control means executes valve position limiting control to adjust, to a predetermined fixed position, a valve position of an outdoor expansion valve to decompress the refrigerant flowing into the outdoor heat exchanger, on the startup of the compressor, and the control means cancels such valve position limiting control after the number of revolution of the compressor reaches the target number of revolution. Consequently, when the control means adjusts the fixed position to a comparatively large value, it is possible to inhibit pressure drop on the suction side on the startup of the compressor. Furthermore, when the outdoor expansion valve is maintained at the fixed position, pressure change in the accumulator which accompanies an operation of the outdoor expansion valve is also inhibited. In consequence, the bumping in the accumulator is effectively inhibited so that the improvements of the reliability and comfort are achievable.

In addition, as in the invention of claim 5, the control means executes valve position limiting control to adjust a valve position of the outdoor expansion valve to a predetermined position on the startup of the compressor and then to gradually expand the valve position, and the control means cancels such valve position limiting control after the number of revolution of the compressor reaches the target number of revolution. Also in this case, it is possible to inhibit the pressure drop on the suction side on the startup of the compressor. Furthermore, it is also possible to minimize the pressure change in the accumulator which accompanies the operation of the outdoor expansion valve, and hence the bumping in the accumulator is effectively inhibited so that the improvements of the reliability and comfort are achievable.

In this case, as in the invention of claim 6, on the basis of the outdoor air temperature, the control means changes the fixed position or the predetermined position in the valve position limiting control so as to enlarge the position as the outdoor air temperature is higher. Consequently, the control means enlarges the fixed position or the predetermined position of the outdoor expansion valve in the environment where the refrigerant density increases, and hence it is possible to further inhibit the pressure drop on the suction side on the startup of the compressor. In consequence, the control means accurately adjusts the fixed position or the predetermined position of the outdoor expansion valve on the basis of the outdoor air temperature, and the bumping in the accumulator is further effectively inhibited so that the improvements of the reliability and comfort are achievable.

Furthermore, according to the invention of claim 7 in addition to the above respective inventions, when the control means stops the compressor, the control means closes an opening/closing valve connected to an upstream side of a refrigerant flow to the accumulator and opened during heating, operates the compressor for the predetermined time, and then stops the compressor. Therefore, inflow of the refrigerant into the accumulator is obstructed after the opening/closing valve closes, and an amount of the refrigerant to be stored in the accumulator decreases when the compressor stops. Consequently, there are also inhibited the bumping of the refrigerant in the accumulator or outflow of the liquid refrigerant from the accumulator on the next startup, and the improvements of the reliability of the vehicular air-conditioning device and the comfort are achievable.

In this case, when the control means lowers the number of revolution of the compressor, and then closes the opening/closing valve as in the invention of claim 8, it is possible to further decrease the amount of the refrigerant in the accumulator.

Furthermore, when the control means closes the opening/closing valve and operates the compressor for the predetermined time while reducing a valve position of an outdoor expansion valve to decompress the refrigerant flowing into the outdoor heat exchanger as in the invention of claim 9, it is possible to store the refrigerant on the upstream side (a high pressure side) from the outdoor expansion valve during the stopping of the compressor. Consequently, when the opening/closing valve opens on the next startup of the compressor, it is possible to decrease the amount of the refrigerant flowing into the accumulator, it is accordingly possible to inhibit generation of the liquid compression on the startup of the compressor, and the reliability can improve.

MODE FOR CARRYING OUT THE INVENTION

Hereinafter, description will be made as to embodiments of the present invention in detail with reference to the drawings.

Embodiment 1

Figure 1:
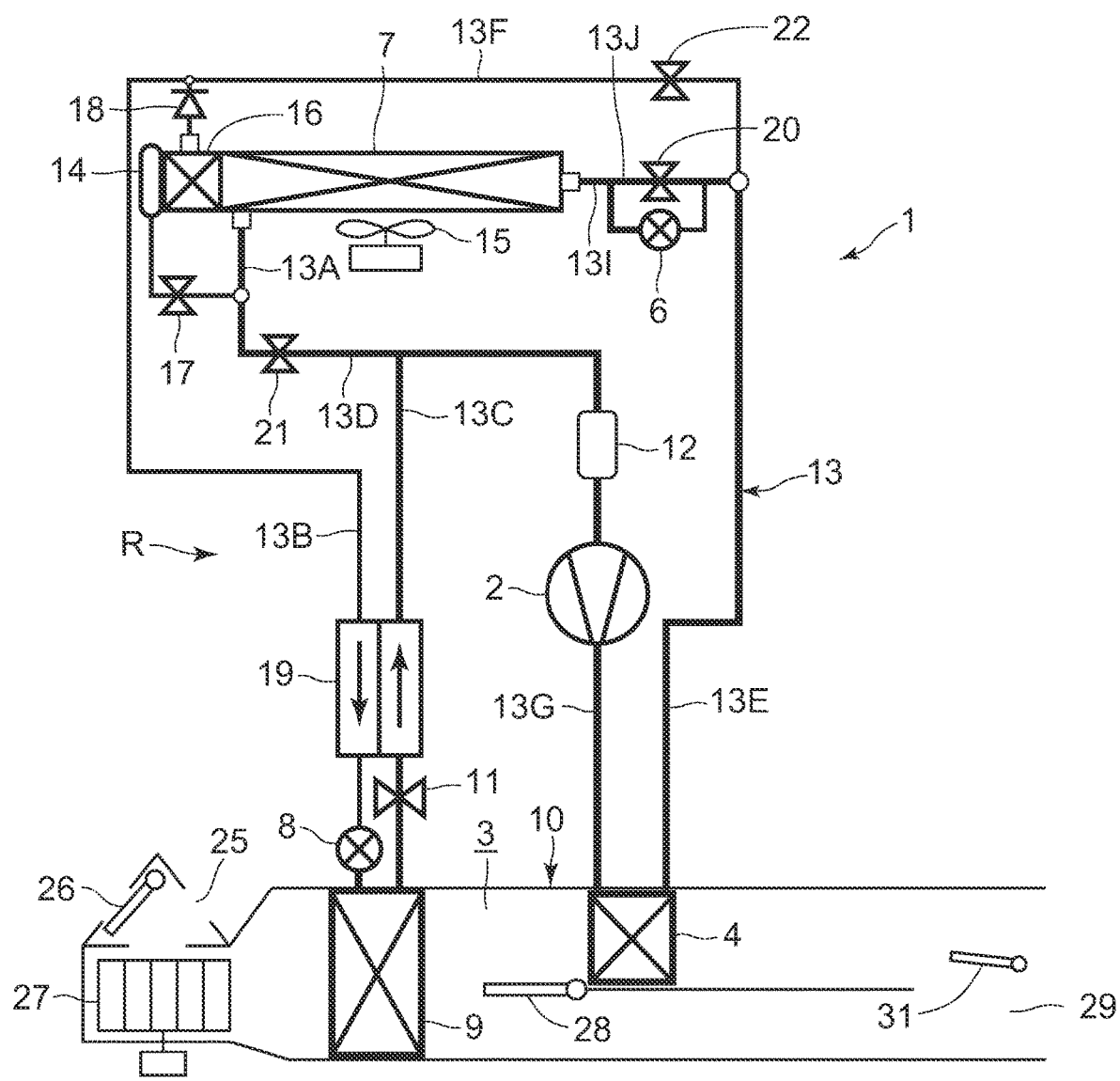
FIG. 1 is a constitutional view of a vehicular air-conditioning device of one embodiment to which the present invention is applied (Embodiment 1)

FIG. 1 shows a constitutional view of a vehicular air-conditioning device 1 of one embodiment of the present invention. A vehicle of the embodiment to which the present invention is applied is an electric vehicle (EV) in which an engine (an internal combustion engine) is not mounted, and runs with an electric motor for running which is driven by power charged in a battery (which is not shown in the drawing), and the vehicular air-conditioning device 1 of the present invention is also driven by the power of the battery. Specifically, in the electric vehicle which is not capable of performing heating by engine waste heat, the vehicular air-conditioning device 1 of the embodiment performs heating by a heat pump operation in which a refrigerant circuit is used, and furthermore, the device selectively executes respective operation modes of dehumidifying and heating, cooling and dehumidifying, cooling and others.

It is to be noted that the vehicle is not limited to such an electric vehicle, and the present invention is also effective for a so-called hybrid car in which an engine is used together with the electric motor for running. Furthermore, needless to say, the present invention is also applicable to a usual car which runs with the engine.

The vehicular air-conditioning device 1 of the embodiment performs air conditioning (heating, cooling, dehumidifying, and ventilation) of a vehicle interior of the car, and there are successively connected, by a refrigerant pipe 13, an electric type of compressor 2 which compresses a refrigerant, a radiator 4 which is disposed in an air flow passage 3 of an HVAC unit 10 in which vehicle interior air passes and circulates, and into which the high-temperature high-pressure refrigerant discharged from the compressor 2 flows via a refrigerant pipe 13G, to let this refrigerant radiate heat in the vehicle interior, an outdoor expansion valve 6 constituted of an electric valve (an electronic expansion valve) which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve (which may be a mechanical expansion valve) to decompress and expand the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 as a gas-liquid separator (a refrigerant liquid reservoir) positioned on a refrigerant suction side of the compressor 2, and others, thereby constituting a refrigerant circuit R.

It is to be noted that in the outdoor heat exchanger 7, an outdoor blower 15 is provided. The outdoor blower 15 forcibly passes the outdoor air through the outdoor heat exchanger 7, to perform the heat exchange between the outdoor air and the refrigerant, whereby the outdoor air passes through the outdoor heat exchanger 7 also during stopping of the vehicle (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 for cooling as an opening/closing valve for cooling to be opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 for heating as an opening/closing valve for heating to be opened during the heating. It is to be noted that as described later, the solenoid valve 21 is positioned on an upstream side of a refrigerant flow to the accumulator 12 during the heating.

In addition, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve 22 for dehumidifying as an opening/closing valve for dehumidifying to be opened during the dehumidifying. That is, the solenoid valve 22 is connected in parallel with the outdoor heat exchanger 7.

Furthermore, the outdoor expansion valve 6 is connected in parallel with a bypass pipe 13J, and in the bypass pipe 13J, a solenoid valve 20 for bypass as an opening/closing valve for bypass is interposed to open in a cooling mode so that the refrigerant bypasses the outdoor expansion valve 6 to flow. It is to be noted that a pipe between the outdoor expansion valve 6 and solenoid valve 20 and the outdoor heat exchanger 7 is denoted with 13I.

Further in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in the air flow passage 3 on the air upstream side of the radiator 4, an air mix damper 28 is disposed to adjust a degree at which the indoor air or outdoor air passes through the radiator 4. Further in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
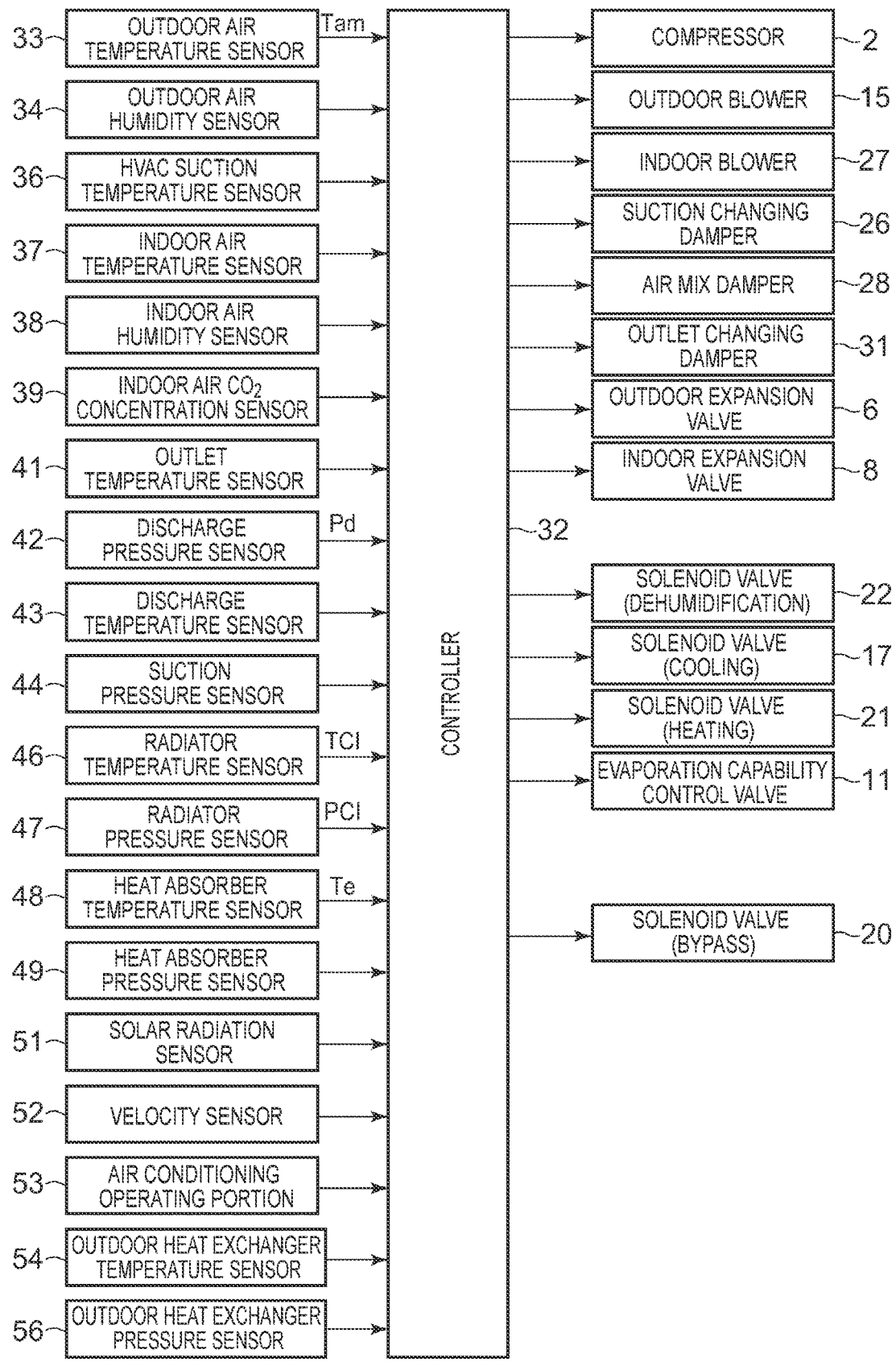
FIG. 2 is a block diagram of an electric circuit of a controller of the vehicular air-conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature Tam of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure Pd of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature TCI of the radiator 4 (the temperature of the air passed through the radiator 4 or the temperature of the radiator 4 itself), a radiator pressure sensor 47 which detects a refrigerant pressure PCI of the radiator 4 (the pressure in the radiator 4 or of the refrigerant which has just flowed out from the radiator 4), a heat absorber temperature sensor 48 which detects a temperature Te of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, and the evaporation capability control valve 11. Then, the controller 32 controls these components on the basis of the outputs of the respective sensors and the setting input by the air conditioning operating portion 53.

Next, description will be made as to an operation of the vehicular air-conditioning device 1 of the embodiment having the above constitution. In the embodiment, the controller 32 changes and executes respective roughly divided operation modes of a heating mode, a dehumidifying and heating mode, an internal cycle mode, a dehumidifying and cooling mode, and a cooling mode. Initially, description will be made as to a flow of the refrigerant in each operation mode.

(1) Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Then, the controller operates the compressor 2 and the respective blowers 15 and 27, and the air mix damper 28 has a state of passing the air blown out from the indoor blower 27 through the radiator 4. In consequence, a high-temperature high-pressure gas refrigerant discharged from the compressor 2 (the refrigerant includes oil discharged from the compressor 2) flows into the radiator 4. The air in the air flow passage 3 passes through the radiator 4, and hence the air in the air flow passage 3 heats by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump, and the outdoor heat exchanger 7 functions as an evaporator of the refrigerant. Then, the low-temperature refrigerant flowing out from the outdoor heat exchanger 7 flows through the refrigerant pipe 13A, the solenoid valve 21 and the refrigerant pipe 13D and flows from the refrigerant pipe 13C into the accumulator 12.

The accumulator 12 is a tank having a predetermined capacity, and its outlet is positioned above a liquid surface of the liquid refrigerant and oil which are stored in the accumulator 12. Therefore, in the refrigerant (including the oil) flowing into the accumulator 12, the liquid refrigerant is once stored in the accumulator 12. Then, a gas refrigerant subjected to the gas-liquid separation is sucked from an outlet of the accumulator 12 into the compressor 2, thereby repeating this circulation (this also applies to the accumulator 12 in the other operation modes).

The air heated in the radiator 4 is blown out from the outlet 29, thereby performing the heating of the vehicle interior. Furthermore, due to such refrigerant flow as described above, the solenoid valve 21 is positioned on the upstream side of the refrigerant flow to the accumulator 12.

The controller 32 controls a number of revolution Nc of the compressor 2 on the basis of the refrigerant pressure of the radiator which is detected by the radiator pressure sensor 47, i.e., the radiator pressure PCI (a high pressure-side pressure of the refrigerant circuit R), controls a valve position ECCV of the outdoor expansion valve 6 on the basis of a subcool degree of the refrigerant which is calculated on the basis of the temperature (the radiator temperature TCI) of the radiator 4 which is detected by the radiator temperature sensor 46, and the radiator pressure PCI, and controls a subcool degree SC of the refrigerant in an outlet of the radiator 4. Description will be made as to control of the compressor 2 and the outdoor expansion valve 6 in the heating mode later in detail.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution Nc of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position), and also closes the solenoid valves 20 and 21. When the outdoor expansion valve 6 and the solenoid valves 20 and 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution Nc of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 or the high pressure, to control the compressor 2.

(4) Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix damper 28 has the state of passing the air blown out from the indoor blower 27 through the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense.

The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution Nc of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls a refrigerant pressure (the radiator pressure PCI) of the radiator 4.

(5) Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)), and the air mix damper 28 includes a state where the air does not pass through the radiator 4 and has a state of controlling a volume of the air to be passed. In consequence, the high-temperature high-pressure gas refrigerant discharged from the compressor 2 flows into the radiator 4. When the air in the air flow passage 3 does not pass through the radiator 4, the refrigerant only passes the radiator, and when the air passes through the radiator, the controller lets the refrigerant radiate heat in the air. The refrigerant flowing out from the radiator 4 flows through the refrigerant pipe 13E to reach the solenoid valve 20 and the outdoor expansion valve 6.

At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 or slightly passes the radiator, but is blown out from the outlet 29 to the vehicle interior, thereby performing cooling of the vehicle interior. In this cooling mode, the controller 32 controls the number of revolution Nc of the compressor 2 on the basis of the temperature of the heat absorber 9 which is detected by the heat absorber temperature sensor 48.

On startup, the controller 32 selects the operation mode on the basis of the outdoor air temperature Tam detected by the outdoor air temperature sensor 33 and a target outlet temperature TAO (described later). Furthermore, after the startup, the controller selects and changes each operation mode mentioned above in accordance with changes of environments of the outdoor air temperature Tam, the target outlet temperature TAO and the like and setting conditions.

(6) Control Blocks of Compressor and Outdoor Expansion Valve in Heating Mode

Figure 3:
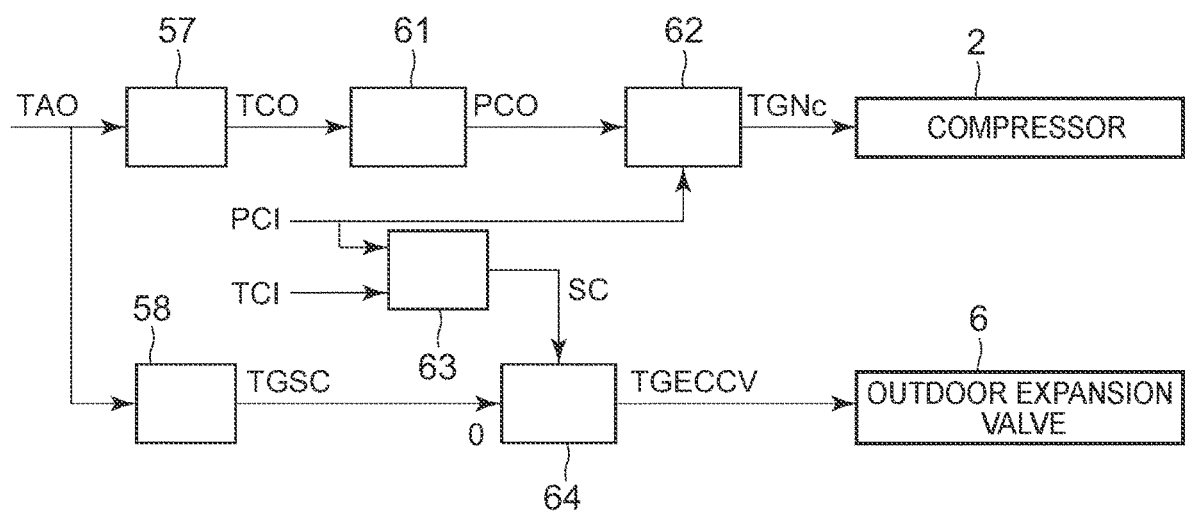
FIG. 3 is a control block diagram of the controller of FIG. 2.

Next, FIG. 3 shows a control block diagram of the compressor 2 and the outdoor expansion valve 6 by the controller 32 in the above heating mode. The controller 32 inputs the target outlet temperature TAO into a radiator target temperature calculation section 57 and a radiator target subcool degree calculation section 58. The target outlet temperature TAO is a target value of the temperature of the air to be blown out from the outlet 29 to the vehicle interior, and the controller 32 calculates the temperature from Equation (1) below.

$$TAO=(Tset-Tin) \times K+Tbal(f(Tset, SUN, Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes.

The controller 32 calculates a radiator target temperature TCO from the target outlet temperature TAO in the radiator target temperature calculation section 57, and next calculates a radiator target pressure PCO on the basis of the radiator target temperature TCO in a radiator target pressure calculation section 61. Then, by F/B control, on the basis of the radiator target pressure PCO and the pressure (the radiator pressure PCI) of the radiator 4 which is detected by the radiator pressure sensor 47, the controller 32 calculates a target number of revolution TGNc of the compressor 2 in a compressor revolution number calculation section 62, and operates and controls the compressor 2 to adjust the number of revolution Nc to the number of revolution TGNc. That is, the controller 32 controls the radiator pressure PCI in accordance with the number of revolution Nc of the compressor 2.

Furthermore, the controller 32 calculates a target subcool degree TGSC of the radiator 4 on the basis of the target outlet temperature TAO in the radiator target subcool degree calculation section 58. On the other hand, the controller 32 calculates the subcool degree of the refrigerant (the radiator subcool degree SC) in the radiator 4 on the basis of the radiator pressure PCI and the temperature of the radiator 4 (the radiator temperature TCI) which is detected by the radiator temperature sensor 46 in a radiator subcool degree calculation section 63. Then, by the F/B control, on the basis of the radiator subcool degree SC and the target subcool degree TGSC, the controller calculates a target valve position (a target outdoor expansion valve position TGECCV) of the outdoor expansion valve 6 in a target outdoor expansion valve position calculation section 64. Then, the controller 32 controls the valve position ECCV of the outdoor expansion valve 6 into the target outdoor expansion valve position TGECCV.

The radiator target subcool degree calculation section 58 of the controller 32 performs the calculation so as to increase the target subcool degree TGSC as the target outlet temperature TAO is higher, but the present invention is not limited to this example, and the controller executes control, for example, to decrease the target subcool degree TGSC as a volume of air of the indoor blower 27 is smaller.

(7) Control on Startup of Compressor in Heating Mode (No. 1)

Figure 4:
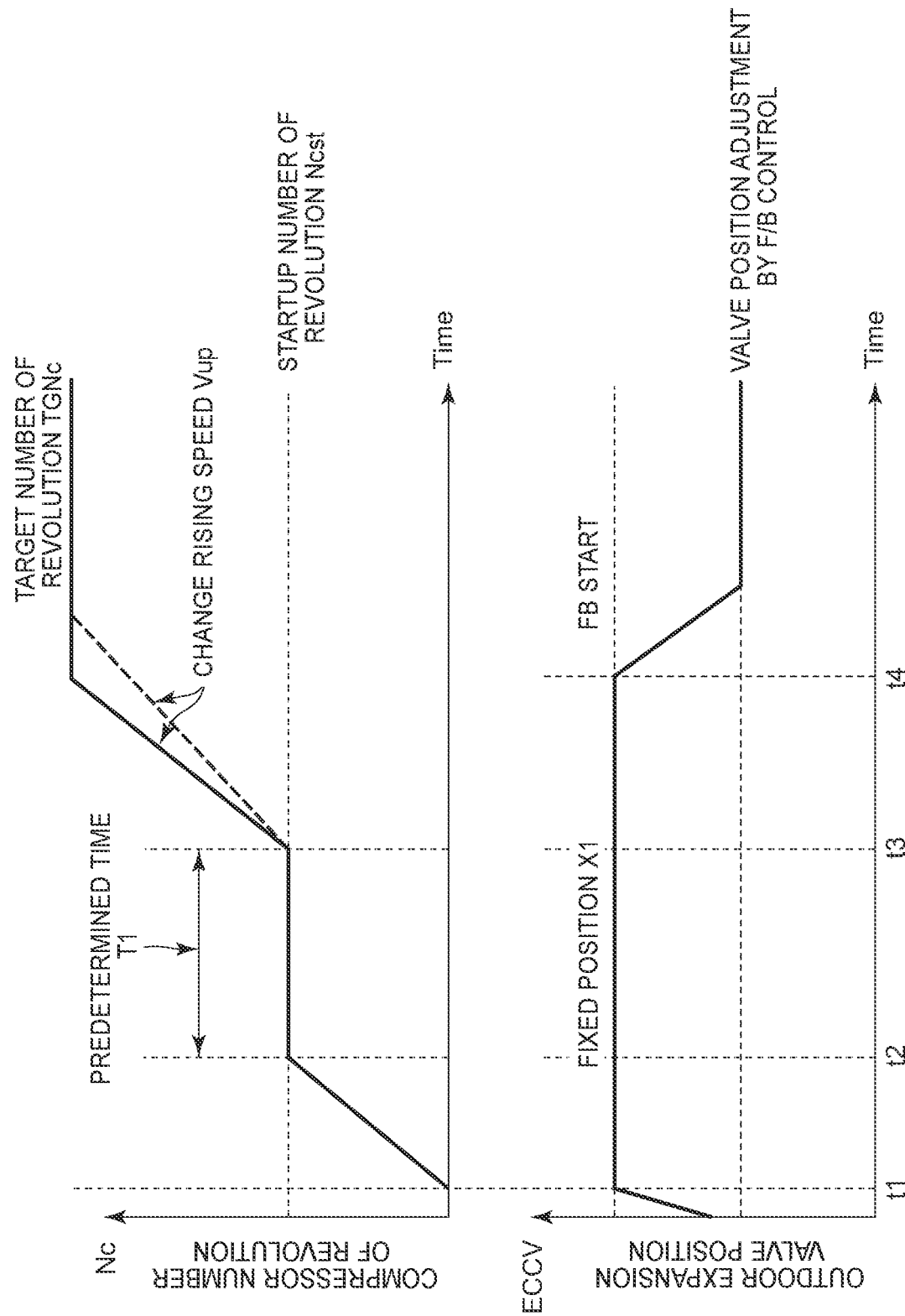
FIG. 4 is a timing chart to explain one example of control on startup of the compressor by the controller of FIG. 2 in a heating mode.

Next, description will be made as to one example of the control on the startup of the compressor 2 in the above-mentioned heating mode with reference to FIG. 4. FIG. 4 is a timing chart to explain the control of the compressor 2 and the outdoor expansion valve 6 which is to be executed by the controller 32 in this case. When the controller 32 starts the compressor 2 in the heating mode, the controller executes startup control to initially raise the number of revolution Nc of the compressor 2 up to a comparatively low predetermined startup number of revolution Ncst, to operate the compressor at the startup number of revolution Ncst for a predetermined time T1, and then to raise the number of revolution Nc of the compressor 2 up to the target number of revolution TGNc calculated as described above at a predetermined rising speed Vup.

Furthermore, as to the outdoor expansion valve 6, on the startup of the compressor 2, the controller executes valve position limiting control to adjust the valve position ECCV to a comparatively large predetermined fixed position X1, and after the number of revolution Nc of the compressor 2 reaches the target number of revolution TGNc, the controller cancels this valve position limiting control and shifts to control to adjust the valve position ECCV to the target valve position TGECCV calculated by the above-mentioned F/B control.

In this case, on the basis of the outdoor air temperature Tam detected by the outdoor air temperature sensor 33, the controller 32 changes the startup number of revolution Ncst of the compressor 2, the predetermined time T1, the rising speed Vup, and the fixed position X1 of the outdoor expansion valve 6 mentioned above in the embodiment. This behavior will be described with reference to the timing chart of FIG. 4.

Now that the compressor 2 starts up at time t1 of FIG. 4, the controller 32 opens the valve position ECCV of the outdoor expansion valve 6 to the fixed position X1 mentioned above until the time t1. The fixed position X1 is determined in a region where the valve position ECCV is large within a control range of the valve position ECCV of the outdoor expansion valve 6, but the controller 32 changes the fixed position so as to enlarge the fixed position X1 as the outdoor air temperature Tam is higher and so as to reduce the fixed position X1 as the outdoor air temperature Tam is lower.

Then, the controller starts the compressor 2 at the time t1 of FIG. 4, and raises the number of revolution Nc up to the startup number of revolution Ncst. The startup number of revolution Ncst is determined in a region where the number of revolution Nc is small within a control range of the number of revolution Nc of the compressor 2, but the controller 32 also changes the startup number of revolution Ncst so as to lower the startup number of revolution Ncst as the outdoor air temperature Tam is higher and so as to raise the startup number of revolution Ncst as the outdoor air temperature Tam is lower.

When the compressor 2 starts up in this manner and the number of revolution rises to the startup number of revolution Ncst at time t2 of FIG. 4, the controller 32 maintains the number of revolution Nc of the compressor 2 at the startup number of revolution Ncst until time t3 after the predetermined time T1 elapses from the time t2. This prevents rapid rise of the number of revolution Nc on the startup of the compressor 2 in the heating mode. Furthermore, for example, in a range of 30 seconds to 60 seconds, the controller 32 also changes the predetermined time T1 so as to lengthen the predetermined time T1 as the outdoor air temperature Tam is higher and so as to shorten the predetermined time T1 as the outdoor air temperature Tam is lower.

Then, when the predetermined time T1 elapses at the time t3 of FIG. 4, the controller 32 raises the number of revolution Nc of the compressor 2 at the predetermined rising speed Vup. The controller 32 also changes the rising speed Vup of the number of revolution Nc so as to decrease the rising speed Vup (as shown by a broken line in FIG. 4) as the outdoor air temperature Tam is higher and so as to increase the rising speed Vup (as shown by a solid line in FIG. 4) as the outdoor air temperature Tam is lower.

Now that the rising speed Vup increases as shown by the solid line of FIG. 4 and the number of revolution Nc of the compressor 2 reaches the target number of revolution TGNc at time t4, the controller 32 cancels the valve position limiting control of the outdoor expansion valve 6, and shifts to adjustment of the valve position by the above-mentioned F/B control.

Thus, in the present invention, the controller 32 continues the operation at the predetermined startup number of revolution Ncst for the predetermined time T1 on the startup of the compressor 2, and then raises the number of revolution Nc of the compressor 2 up to the predetermined target number of revolution TGNc at the predetermined rising speed Vup, and also changes the startup number of revolution Ncst of the compressor 2 on the basis of the outdoor air temperature Tam so as to lower the startup number of revolution as the outdoor air temperature Tam is higher. Therefore, in an environment where a refrigerant density increases, the controller lowers the startup number of revolution Ncst of the compressor 2, and hence it is possible to inhibit rapid pressure drop in the accumulator 12.

Consequently, it is possible to accurately prevent or inhibit bumping of the refrigerant in the accumulator 12 on the startup of the compressor 2, it is possible to effectively cancel or inhibit generations of liquid compression in the compressor 2 and noise in the accumulator 12, reliability of the vehicular air-conditioning device 1 can improve, and comfort of passengers can also effectively improve.

Furthermore, on the basis of the outdoor air temperature Tam, the controller 32 changes the predetermined time T1 so as to lengthen the time as the outdoor air temperature Tam is higher, and hence in the environment where the refrigerant density increases, the controller lengthens the predetermined time T1 for which the compressor 2 operates at the startup number of revolution Ncst, and it is possible to further inhibit the rapid pressure drop in the accumulator 12. In consequence, the controller accurately adjusts the operation time at the startup number of revolution Ncst of the compressor 2 on the basis of the outdoor air temperature Tam, and the bumping in the accumulator 12 is further securely inhibited so that the improvements of the reliability and comfort are achievable.

Furthermore, the controller 32 changes the rising speed Vup so as to decrease the rising speed as the outdoor air temperature Tam is higher, on the basis of the outdoor air temperature Tam. Therefore, in the environment where the refrigerant density increases, the controller decreases the rate at which the number of revolution Nc of the compressor 2 rises from the startup number of revolution Ncst, and hence it is possible to further inhibit the rapid pressure drop in the accumulator 12. In consequence, the controller accurately adjusts the rising speed Vup of the number of revolution Nc of the compressor 2 on the basis of the outdoor air temperature Tam, and the bumping in the accumulator 12 is further securely inhibited so that the improvements of the reliability and comfort are achievable.

Additionally, the controller 32 executes the valve position limiting control to adjust the valve position ECCV of the outdoor expansion valve 6 to the comparatively large predetermined fixed position X1 on the startup of the compressor 2, and the controller cancels the valve position limiting control after the number of revolution Nc of the compressor 2 reaches the target number of revolution TGNc.

Therefore, it is possible to inhibit pressure drop on the suction side on the startup of the compressor 2. Furthermore, when the outdoor expansion valve 6 is maintained at the fixed position X1, pressure change in the accumulator 12 which accompanies the operation of the outdoor expansion valve 6 is also inhibited. In consequence, the bumping in the accumulator 12 is effectively inhibited so that the improvements of the reliability and comfort are achievable.

Also in this case, the controller 32 changes the fixed position X1 in the valve position limiting control so as to enlarge the fixed position as the outdoor air temperature Tam is higher, on the basis of the outdoor air temperature Tam, and hence in the environment where the refrigerant density increases, the controller enlarges the fixed position X1 of the outdoor expansion valve 6, and hence it is possible to further inhibit the pressure drop on the suction side on the startup of the compressor 2. In consequence, the controller accurately adjusts the fixed position X1 of the outdoor expansion valve 6 on the basis of the outdoor air temperature Tam, and the bumping in the accumulator 12 is further effectively inhibited so that the improvements of the reliability and comfort are achievable.

(8) Control on Startup of Compressor in Heating Mode (No. 2)

Figure 5:
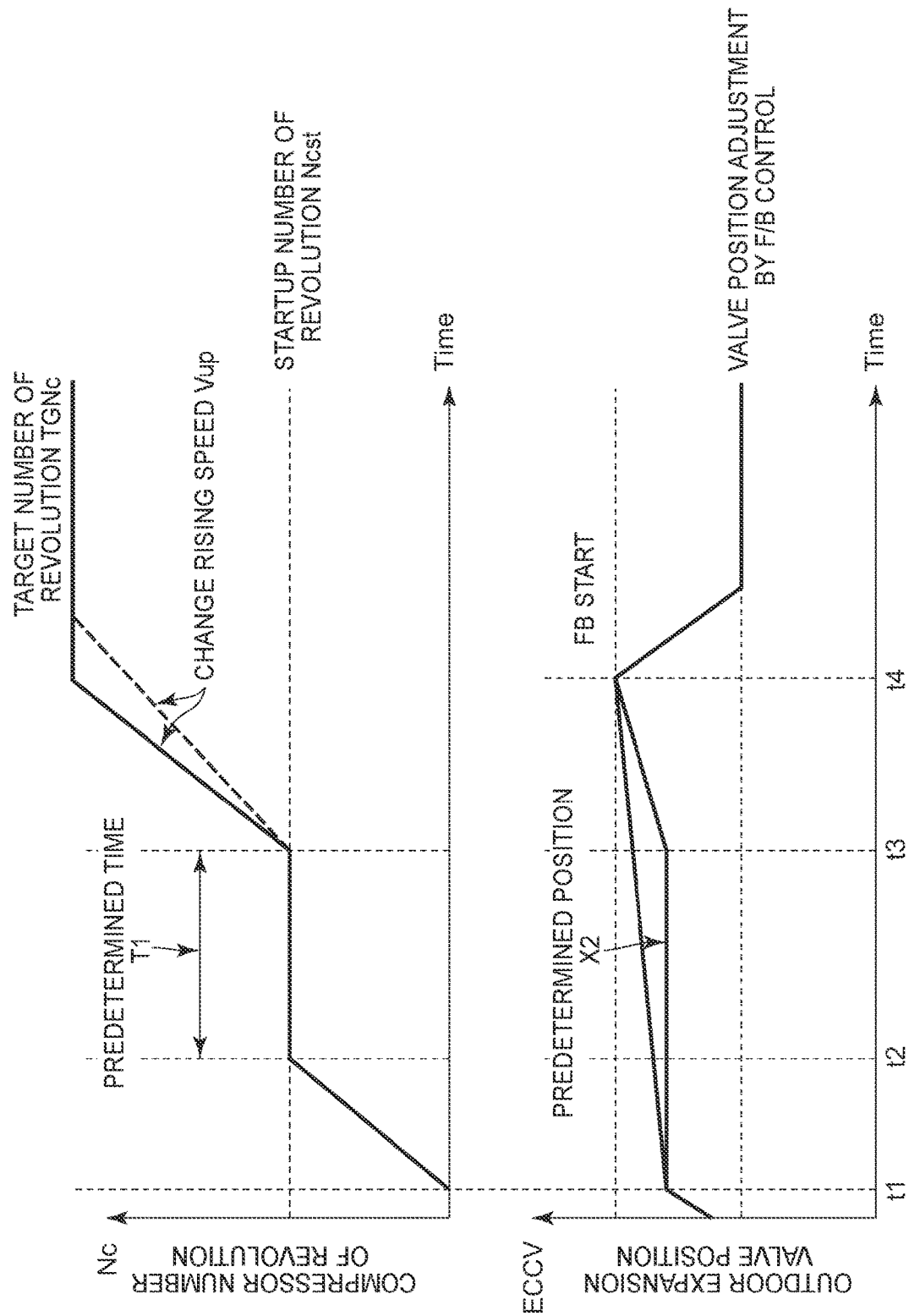
FIG. 5 is a timing chart to explain another example of the control on the startup of the controller by the controller of FIG. 2 in the heating mode.

Next, description will be made as to another example of the control on the startup of the compressor 2 in the heating mode with reference to FIG. 5. FIG. 5 is a timing chart to explain the control of the compressor 2 and the outdoor expansion valve 6 which is to be executed by the controller 32 in this case. It is to be noted that the control on the startup of the compressor 2 is similar to that in the example of FIG. 4, and hence the description is omitted.

In this case, as to the outdoor expansion valve 6, the controller 32 executes valve position limiting control to adjust the valve position ECCV to a comparatively large predetermined position X2 on the startup of the compressor 2 and then to gradually expand the valve position ECCV in this case, and after the number of revolution Nc of the compressor 2 reaches the target number of revolution TGNc, the controller cancels this valve position limiting control, and shifts to control to adjust the valve position ECCV to the target valve position TGECCV calculated by the above-mentioned F/B control.

Then, also in this case, the controller 32 changes the predetermined position X2 of the outdoor expansion valve 6 on the basis of the outdoor air temperature Tam detected by the outdoor air temperature sensor 33. This behavior will be described with reference to the timing chart of FIG. 5. Now that the compressor 2 starts up at time t1 of FIG. 5, the controller 32 opens the valve position ECCV of the outdoor expansion valve 6 to the predetermined position X2 mentioned above until the time t1. The predetermined position X2 is also determined in the region where the valve position ECCV is large within the control range of the valve position ECCV of the outdoor expansion valve 6, but the controller 32 changes the predetermined position so as to enlarge the predetermined position X2 as the outdoor air temperature Tam is higher and so as to reduce the predetermined position X2 as the outdoor air temperature Tam is lower.

Furthermore, in the embodiment, there are two types systems to expand the valve position ECCV from such predetermined position X2. In one system, the controller adjusts the valve position to the predetermined position X2 at the time t1 and then continuously opens the valve at a predetermined expansion rate until time t4 of FIG. 5 at which the number of revolution Nc of the compressor 2 reaches the target number of revolution TGNc (an upper inclined line of FIG. 5), and in the other system, the controller maintains the predetermined position X2 until time t3 of FIG. 5 after elapse of the predetermined time T1 for which the controller maintains the number of revolution Nc of the compressor 2 at the startup number of revolution Ncst, and the controller opens the valve at a predetermined expansion rate until the time t4 (a lower horizontal line and an inclined line in FIG. 5).

In any case, it is possible to inhibit the pressure drop on the suction side on the startup of the compressor 2. Furthermore, it is also possible to minimize the pressure change in the accumulator 12 which accompanies the operation of the outdoor expansion valve 6, and hence the bumping in the accumulator 12 is effectively inhibited so that the improvements of the reliability and comfort are achievable.

Furthermore, also in this case, the controller 32 changes the predetermined position X2 in the valve position limiting control so as to enlarge the position as the outdoor air temperature Tam is higher, on the basis of the outdoor air temperature Tam, and hence in the environment where the refrigerant density increases, the controller enlarges the predetermined position X2 of the outdoor expansion valve 6, and hence it is possible to further inhibit the pressure drop on the suction side on the startup of the compressor 2. Consequently, also in this example, the controller accurately adjusts the predetermined position X2 of the outdoor expansion valve 6 on the basis of the outdoor air temperature Tam, and the bumping in the accumulator 12 is further effectively inhibited so that the improvements of the reliability and comfort are achievable.

(9) Control during Stopping of Compressor in Heating Mode (No. 1)

Figure 6:
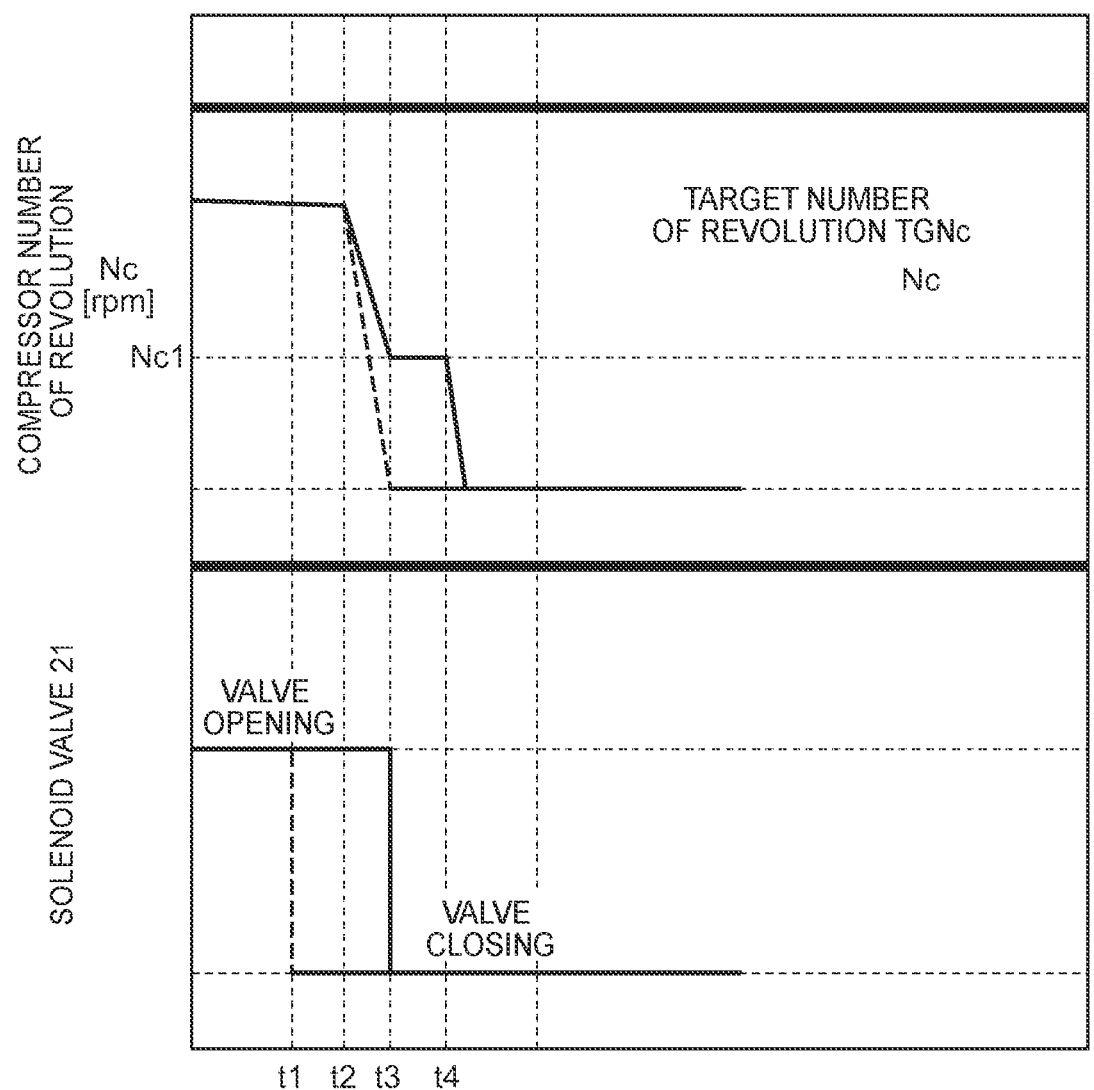
FIG. 6 is a timing chart to explain one example of control during stopping of the compressor by the controller of FIG. 2 in the heating mode.

Next, description will be made as to one example of control during stopping of the compressor 2 in the heating mode with reference to FIG. 6. FIG. 6 is a timing chart to explain the control of the compressor 2 and the solenoid valve 21 which is to be executed by the controller 32 in this case. When the controller 32 stops the compressor 2 in the heating mode, the controller initially closes the solenoid valve 21 for heating which is connected to the refrigerant upstream side of the accumulator 12 (valve closing), operates the compressor 2 for a predetermined time, and then stops the compressor.

This behavior will be described with reference to the timing chart of FIG. 6. When the controller 32 stops the compressor 2 in the heating mode, the controller initially closes the solenoid valve 21 at time t1 of FIG. 6 as shown by a broken line (valve closing). The solenoid valve 21 closes in this manner, and thereafter inflow of the refrigerant into the accumulator 12 is obstructed. Afterward, the controller operates the compressor 2 for a predetermined time, lowers the number of revolution Nc of the compressor 2 at a prescribed lowering rate from time t2 of FIG. 6, and then stops the compressor 2 at time t3.

Thus, when the controller 32 stops the compressor 2, the controller closes the solenoid valve 21 connected to the upstream side of the refrigerant flow to the accumulator 12 and opened during the heating, operates the compressor 2 for the predetermined time, and then stops the compressor 2. Therefore, the inflow of the refrigerant into the accumulator 12 is obstructed after the solenoid valve 21 closes, and an amount of the refrigerant to be stored in the accumulator 12 decreases when the compressor 2 stops.

Consequently, there are also inhibited the bumping of the refrigerant in the accumulator 12 or outflow of the liquid refrigerant from the accumulator 12 on the next startup, and the improvements of the reliability of the vehicular air-conditioning device 1 and the comfort are achievable.

(10) Control during Stopping of Compressor in Heating Mode (No. 2)

It is to be noted that in the above control, the controller may once lower the number of revolution Nc of the compressor 2 and then close the solenoid valve 21. FIG. 6 shows such control by a solid line. Specifically, in this case, the controller 32 does not close the solenoid valve 21 at the time t1, and initially lowers the number of revolution Nc of the compressor 2 down to a lower value of a predetermined number of revolution Nc1 between the time t2 and the time t3. Then, the controller lowers the number of revolution to the predetermined number of revolution Nc1, and then closes the solenoid valve 21 at the time t3 (valve closing).

Afterward, the controller 32 operates the compressor 2 at the number of revolution Nc1 for a predetermined time till time t4, and then stops the compressor. Thus, when the controller 32 lowers the number of revolution Nc of the compressor 2 and then closes the solenoid valve 21, it is possible to further decrease the amount of the refrigerant in the accumulator 12.

(11) Control during Stopping of Compressor in Heating Mode (No. 3)

Figure 7:
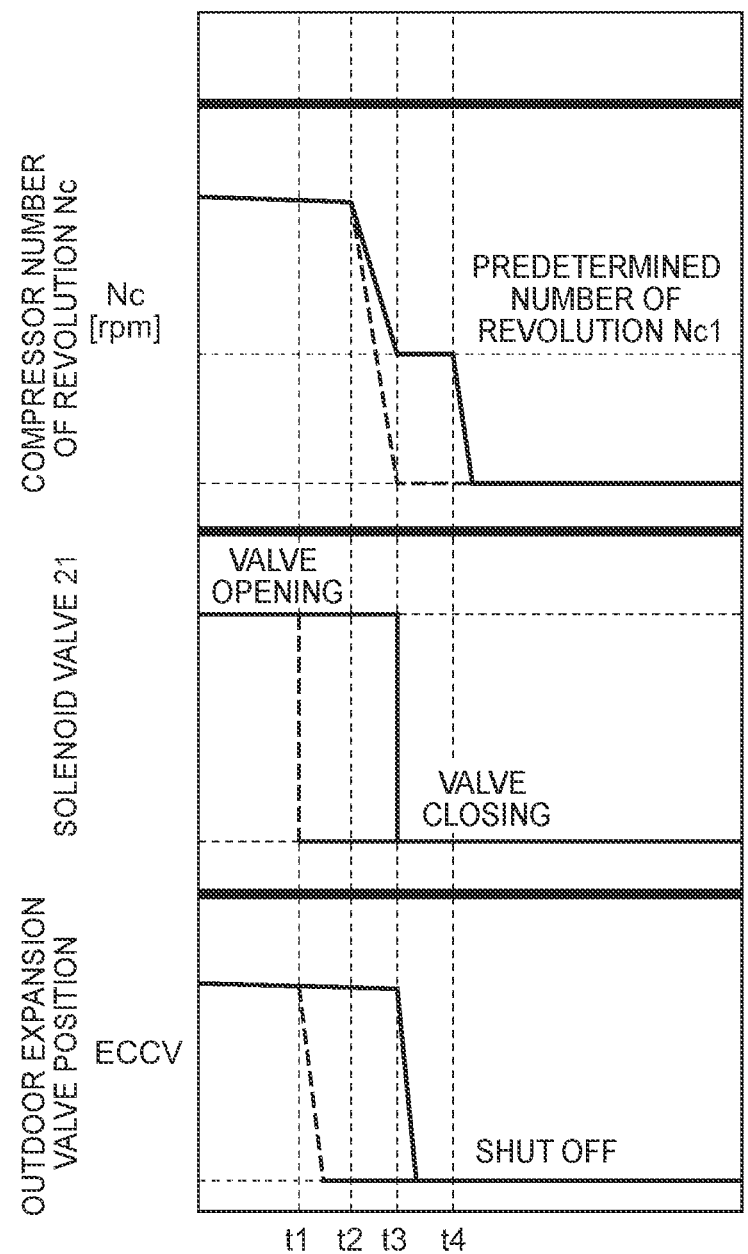
FIG. 7 is a timing chart to explain another example of the control during the stopping of the compressor by the controller of FIG. 2 in the heating mode.

Next, description will be made as to another example of the control during the stopping of the compressor 2 in the heating mode with reference to FIG. 7. FIG. 7 is a timing chart to explain the control of the compressor 2, the solenoid valve 21 and the outdoor expansion valve 6 which is to be executed by the controller 32 in this case. In this case, when the controller 32 stops the compressor 2 in the heating mode, the controller initially closes the solenoid valve 21 for heating which is connected to the refrigerant upstream side of the accumulator 12 (valve closing), operates the compressor 2 for a predetermined time while reducing the valve position ECCV of the outdoor expansion valve 6, and then stops the compressor.

This behavior will be described with reference to the timing chart of FIG. 7. When the controller 32 stops the compressor 2 in the heating mode, the controller initially closes the solenoid valve 21 at time t1 of FIG. 7 as shown by a broken line (valve closing). The solenoid valve 21 closes in this manner, and thereafter the inflow of the refrigerant into the accumulator 12 is obstructed. Afterward, as shown by the broken line in FIG. 7, the controller operates the compressor 2 for a predetermined time while shutting off the valve position ECCV of the outdoor expansion valve 6 or reducing the valve position to a minimum position, lowers the number of revolution Nc of the compressor 2 at a prescribed lowering rate from time t2 of FIG. 7, and then stops the compressor 2 at time t3.

Thus, when the controller 32 stops the compressor 2, the controller closes the solenoid valve 21 for heating, operates the compressor 2 for the predetermined time while reducing the valve position ECCV of the outdoor expansion valve 6, and then stops the compressor 2. Therefore, it is possible to store the refrigerant on the upstream side (a high pressure side of the refrigerant circuit R) from the outdoor expansion valve 6 during the stopping of the compressor 2. Consequently, when the solenoid valve 21 opens on the next startup of the compressor 2, it is possible to decrease the amount of the refrigerant flowing into the accumulator 12, it is accordingly possible to inhibit generation of the liquid compression on the startup of the compressor 2, and the reliability can improve.

(12) Control during Stopping of Compressor in Heating Mode (No. 4)

It is to be noted that also in the above control, the controller may once lower the number of revolution Nc of the compressor 2 and then close the solenoid valve 21. FIG. 7 shows such control by a solid line. Specifically, in this case, the controller 32 does not close the solenoid valve 21 at the time t1, and initially lowers the number of revolution Nc of the compressor 2 down to a lower value of a predetermined number of revolution Nc1 between the time t2 and the time t3. Then, the controller lowers the number of revolution to the predetermined number of revolution Nc1, and then closes the solenoid valve 21 at the time t3 (valve closing shown by a solid line in FIG. 7).

Afterward, the controller 32 operates the compressor 2 at the number of revolution Nc1 for a predetermined time until time t4 while shutting off the valve position ECCV of the outdoor expansion valve 6 or reducing the valve position to a minimum valve position from the time t3 (shown by the solid line in FIG. 7), and then stops the compressor. When the controller 32 lowers the number of revolution Nc of the compressor 2 and then closes the solenoid valve 21 in this manner, it is possible to further decrease the amount of the refrigerant in the accumulator 12.

Embodiment 2

Figure 8:
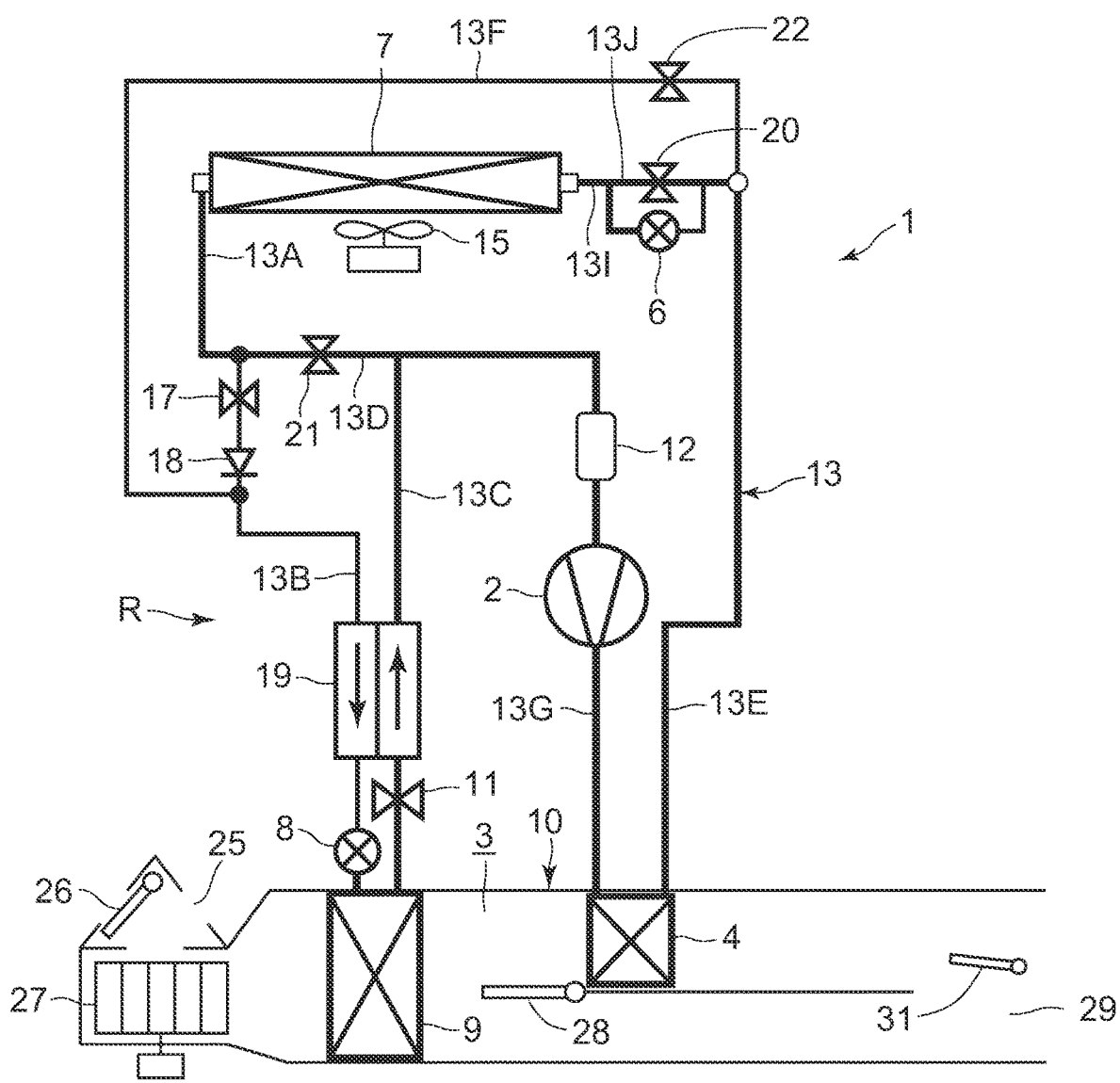
FIG. 8 is a constitutional view of the vehicular air-conditioning device of another embodiment to which the present invention is applicable (Embodiment 2)

Next, FIG. 8 shows another constitutional view of the vehicular air-conditioning device 1 of the present invention. In this embodiment, a receiver drier portion 14 and a subcooling portion 16 are not provided in an outdoor heat exchanger 7, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the vehicular air-conditioning device 1 of a refrigerant circuit R employing the outdoor heat exchanger 7 which does not have the receiver drier portion 14 and the subcooling portion 16 in this manner.

Embodiment 3

Figure 9:
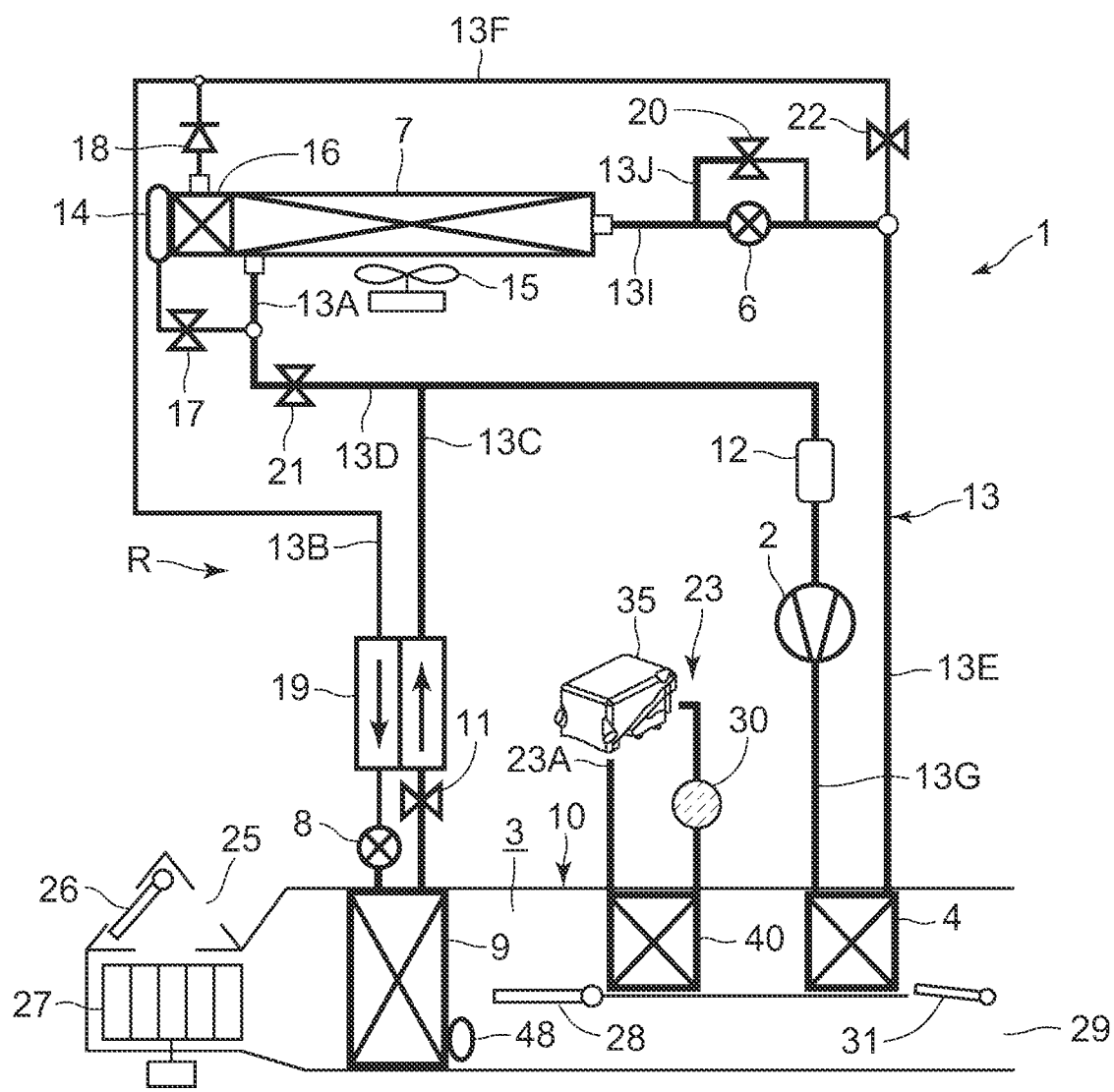
FIG. 9 is a constitutional view of the vehicular air-conditioning device of still another embodiment to which the present invention is applicable (Embodiment 3).

Next, FIG. 9 shows still another constitutional view of the vehicular air-conditioning device 1 of the present invention. In this embodiment, a heating medium circulating circuit 23 is disposed as auxiliary heating means in the vehicular air-conditioning device 1. The heating medium circulating circuit 23 includes a circulating pump 30 constituting circulating means, a heating medium heating electric heater 35, and a heating medium-air heat exchanger 40 disposed in the air flow passage 3 on an air upstream side of the radiator 4 with respect to the air flow in the air flow passage 3, and these components are successively annularly connected to one another by a heating medium pipe 23A. It is to be noted that as a heating medium to circulate in the heating medium circulating circuit 23, for example, water, a refrigerant such as HFO-1234yf, a coolant or the like is employed.

Furthermore, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and when a heating capability by the radiator 4 is insufficient, the heating medium heating electric heater 35 and the circulating pump 30 are operated to complement the heating of the vehicle interior. The employing of the heating medium circulating circuit 23 can improve electric safety of passengers.

The other constitution is similar to the example of FIG. 1. Thus, the present invention is also effective in the vehicular air-conditioning device 1 in which the heating medium circulating circuit 23 is provided as the auxiliary heating means.

It is to be noted that, needless to say, the constitution or each numeric value of the refrigerant circuit R described above in each embodiment is not limited to the embodiment, and is changeable without departing from the gist of the present invention.

DESCRIPTION OF REFERENCE NUMERALS 1 vehicular air-conditioning device
2 compressor
3 air flow passage
4 radiator
6 outdoor expansion valve
7 outdoor heat exchanger
8 indoor expansion valve
9 heat absorber
11 evaporation capability control valve
12 accumulator
17, 20, 21 and 22 solenoid valve (opening/closing valve)
26 suction changing damper
27 indoor blower (blower fan)
28 air mix damper
32 controller (control means)
R refrigerant circuit

The invention claimed is:

1. A vehicular air-conditioning device which comprises
a compressor to compress a refrigerant,
an air flow passage through which air to be supplied to a vehicle interior flows,
a radiator disposed in the air flow passage to radiate heat of the refrigerant,
an outdoor heat exchanger disposed outside the vehicle interior so that the refrigerant absorbs heat,
an accumulator connected to a refrigerant suction side of the compressor,
an outdoor expansion valve to decompress the refrigerant flowing into the outdoor heat exchanger, and
a controller;
the controller controls such that the refrigerant discharged from the compressor radiates heat in the radiator, and controls the outdoor expansion valve to decompress the refrigerant from which the heat has been radiated, so that the refrigerant absorbs heat in the outdoor heat exchanger, thereby heating the vehicle interior;
wherein after startup of the compressor, the controller maintains an operation at a predetermined startup number of revolutions per minute of the compressor for a predetermined period of time, and then raises the number of revolutions per minute of the compressor to a predetermined target number of revolutions per minute of the compressor at a predetermined rising speed, and changes the startup number of revolutions per minute of the compressor so as to lower the startup number of revolutions per minute of the compressor as the outdoor air temperature is higher, on the basis of an outdoor air temperature.

2. The vehicular air-conditioning device according to claim 1, wherein on the basis of the outdoor air temperature, the controller changes the predetermined period of time so as to lengthen the predetermined period of time as the outdoor air temperature increases.

3. The vehicular air-conditioning device according to claim 1, wherein on the basis of the outdoor air temperature, the controller changes the rising speed so as to decrease the rising speed as the outdoor air temperature increases.

4. The vehicular air-conditioning device according to claim 1, wherein the controller executes valve position limiting control to adjust a valve position of the outdoor expansion valve to a predetermined fixed position on the startup of the compressor, and cancels the valve position limiting control after the number of revolutions per minute of the compressor reaches the target number of revolutions per minute of the compressor.

5. The vehicular air-conditioning device according to claim 1, wherein the controller executes valve position limiting control to adjust a valve position of the outdoor expansion valve to a predetermined position on the startup of the compressor and then to gradually expand the valve position, and the controller cancels the valve position limiting control after the number of revolutions per minute of the compressor reaches the target number of revolutions per minute of the compressor.

6. The vehicular air-conditioning device according to claim 4, wherein on the basis of the outdoor air temperature, the controller changes the predetermined fixed position in the valve position limiting control so as to enlarge the position as the outdoor air temperature increases.

7. The vehicular air-conditioning device according to claim 1, comprising:

an opening/closing valve connected to an upstream side of a refrigerant flow to the accumulator and opened during heating, wherein when the controller stops the compressor, the controller closes the opening/closing valve, operates the compressor for the predetermined period of time, and then stops the compressor.

8. The vehicular air-conditioning device according to claim 7, wherein the controller lowers the number of revolutions per minute of the compressor, and then closes the opening/closing valve.

9. The vehicular air-conditioning device according to claim 7, wherein the controller closes the opening/closing valve and operates the compressor for the predetermined period of time while reducing a valve position of the outdoor expansion valve.

10. The vehicular air-conditioning device according to claim 5, wherein on the basis of the outdoor air temperature, the controller changes the predetermined position in the valve position limiting control so as to enlarge the position as the outdoor air temperature increases.

* * * * *